United States Patent
Shang et al.

(10) Patent No.: US 7,346,633 B2
(45) Date of Patent: Mar. 18, 2008

(54) SYSTEM PROVIDING METHODOLOGY FOR REPLICATION SUBSCRIPTION RESOLUTION

(75) Inventors: Heping Shang, Walnut Creek, CA (US); Zhenpeng Li, Pleasanton, CA (US)

(73) Assignee: Sybase, Inc., Dublin, CA (US)

( * ) Notice: Subject to any disclaimer, the term of this patent is extended or adjusted under 35 U.S.C. 154(b) by 216 days.

(21) Appl. No.: 10/709,974

(22) Filed: Jun. 10, 2004

(65) Prior Publication Data
US 2005/0278346 A1    Dec. 15, 2005

(51) Int. Cl.
*G06F 17/30* (2006.01)

(52) U.S. Cl. ............ 707/201; 707/200; 707/204; 707/102

(58) Field of Classification Search ........... 707/201
See application file for complete search history.

(56) References Cited

U.S. PATENT DOCUMENTS

| | | | |
|---|---|---|---|
| 5,307,481 A | 4/1994 | Shimazaki et al. | 714/11 |
| 5,333,265 A | 7/1994 | Orimo et al. | 709/201 |
| 5,434,994 A | 7/1995 | Shaheen et al. | 709/223 |
| 5,581,704 A | 12/1996 | Barbara et al. | 711/141 |
| 5,588,147 A | 12/1996 | Neeman et al. | 707/1 |
| 5,615,337 A | 3/1997 | Zimowski et al. | 707/3 |
| 5,625,818 A * | 4/1997 | Zarmer et al. | 707/104.1 |
| 5,689,697 A | 11/1997 | Edwards et al. | 707/3 |
| 5,713,017 A | 1/1998 | Lin et al. | 707/8 |
| 5,765,171 A | 6/1998 | Gehani et al. | 707/203 |
| 5,819,272 A | 10/1998 | Benson | 707/8 |
| 5,864,851 A | 1/1999 | Breitbart et al. | 707/8 |
| 5,884,324 A | 3/1999 | Cheng et al. | 707/201 |
| 5,892,909 A | 4/1999 | Grasso et al. | 709/201 |
| 5,913,032 A | 6/1999 | Schwartz et al. | 709/213 |
| 5,937,413 A | 8/1999 | Hyun et al. | 707/201 |
| 5,937,415 A | 8/1999 | Sheffield et al. | 707/204 |
| 5,995,980 A | 11/1999 | Olson et al. | 707/201 |
| 6,151,708 A * | 11/2000 | Pedrizetti et al. | 717/173 |
| 6,253,211 B1 | 6/2001 | Gillies et al. | 707/201 |
| 6,269,432 B1 | 7/2001 | Smith | 711/162 |
| 6,304,882 B1 | 10/2001 | Strellis et al. | 707/202 |
| 6,421,714 B1 | 7/2002 | Rai et al. | 709/217 |
| 6,446,092 B1 | 9/2002 | Sutter | 707/203 |
| 6,453,326 B1 | 9/2002 | Parham et al. | 707/204 |
| 6,453,353 B1 | 9/2002 | Win et al. | 709/229 |
| 6,457,011 B1 | 9/2002 | Brace et al. | 707/10 |
| 6,516,327 B1 | 2/2003 | Zondervan et al. | 707/200 |
| 6,598,077 B2 | 7/2003 | Primak et al. | 709/219 |

(Continued)

*Primary Examiner*—Jeffrey Gaffin
*Assistant Examiner*—Christyann Pulliam
(74) *Attorney, Agent, or Firm*—John A. Smart; G. Mack Riddle

(57) ABSTRACT

A system providing methodology for replication subscription resolution. In one embodiment, for example, a system of the present invention for determining subscribers to which a published item of data should be replicated comprises: an interface module for receiving user input of lists of a plurality of subscribers, each list specifying items of data to be replicated to a given subscriber, a build module for building an index based on the lists of the plurality of subscribers containing entries indicating subscribers For each item of data specified in the lists and a default list of subscribers for items of data not matching any of the entries; and a resolution module for receiving a published item of data and determining subscribers to which the published item should be replicated based on the index.

38 Claims, 6 Drawing Sheets

U.S. PATENT DOCUMENTS

| | | |
|---|---|---|
| 6,622,152 B1 | 9/2003 | Sinn et al. .................. 118/681 |
| 6,636,873 B1 | 10/2003 | Merchant et al. ........... 370/445 |
| 6,643,670 B2 | 11/2003 | Parham et al. .............. 707/201 |
| 6,654,746 B1 * | 11/2003 | Wong et al. .................. 707/10 |
| 6,654,771 B1 | 11/2003 | Parham et al. .............. 707/204 |
| 6,718,361 B1 * | 4/2004 | Basani et al. ................ 709/201 |
| 6,782,399 B2 | 8/2004 | Mosher ...................... 707/200 |
| 6,845,383 B1 | 1/2005 | Kraenzel et al. ............ 707/200 |
| 2004/0139166 A1 * | 7/2004 | Collison ..................... 709/207 |
| 2005/0165858 A1 * | 7/2005 | Tom et al. .................. 707/201 |

* cited by examiner

SYSTEM PROVIDING METHODOLOGY FOR REPLICATION SUBSCRIPTION RESOLUTION

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode.txt, size 31.2 KB, created Jun. 3, 2004, 4:38 pm; Object ID: File No. 1; Object Contents: Source Code.

BACKGROUND OF INVENTION

1. Field of the Invention

The present invention relates generally to data processing environments and, more particularly, to a system providing methodology for replication subscription resolution.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Addison Wesley, 2000.

Increasingly, businesses run mission-critical systems which store information on database management systems. Each day more and more users base their business operations on mission-critical systems which store information on server-based database systems, such as Sybase® Adaptive Server® Enterprise (available from Sybase, Inc. of Dublin, Calif.). As a result, the operations of the business are dependent upon the availability of data stored in their databases. Because of the mission-critical nature of these systems, users of these systems need to protect themselves against loss of the data due to software or hardware problems, disasters such as floods, earthquakes, or electrical power loss, or temporary unavailability of systems resulting from the need to perform system maintenance.

One well-known approach that is used to guard against loss of critical business data maintained in a given database (the "primary database") is to maintain one or more standby or replicate databases. A replicate database is a duplicate or mirror copy of the primary database (or a subset of the primary database) that is maintained either locally at the same site as the primary database, or remotely at a different location than the primary database. The availability of a replicate copy of the primary database enables a user (e.g., a corporation or other business) to reconstruct a copy of the database in the event of the loss, destruction, or unavailability of the primary database.

Replicate database(s) are also used to facilitate access and use of data maintained in the primary database (e.g., for decision support and other such purposes). For instance, a primary database may support a sales application and contain information regarding a company's sales transactions with its customers. The company may replicate data from the primary database to one or more replicate databases to enable users to analyze and use this data for other purposes (e.g., decision support purposes) without interfering with or increasing the workload on the primary database. The data that is replicated (or copied) to a replicate database may include all of the data of the primary database such that the replicate database is a mirror image of the primary database. Alternatively, only a subset of the data may be replicated to a given replicate database (e.g., because only a subset of the data is of interest in a particular application).

In recent years, the use of replication technologies has been increasing as users have discovered new ways of using copies of all sorts of data. Various different types of systems ranging from electronic mail systems and document management systems to data warehouse and decision support systems rely on replication technologies for providing broader access to data. Over the years, database replication technologies have also become available in vendor products ranging from simple desktop replication (e.g., between two personal computers) to high-capacity, multi-site backup systems.

Database replication technologies comprise a mechanism or tool for replicating (duplicating) data from a primary source or "publisher" (e.g., a primary database) to one or more "subscribers" (e.g., replicate databases). The data may also be transformed during this process of replication (e.g., into a format consistent with that of a replicate database). In the following discussion, the source(s) from which data is being replicated will be referred to as the "primary database" or "publisher". A recipient which is receiving data replicated from the source (i.e., from the primary database) is referred to herein as a "replicate database" or "subscriber".

In many cases, a primary database may publish (i.e., replicate) items of data to a number of different subscribers. Also, in many cases, each of these subscribers is only interested in receiving a subset of the data maintained by the primary database. Each subscriber may have an extensive list of items or types of data that are of interest (i.e., the items that the replicate database wants to receive from the primary database). Different subscribers may have different lists and may want different information from the tables of the primary database. In this type of environment, each of the subscribers specifies particular types or items of data ("subscribed items") that the subscriber wants to receive from the primary database.

A problem in this type of environment involving a number of subscribers (i.e., replicate databases) wanting access to different types of data from the primary database is how to efficiently determine which subscribers should receive particular items of data generated by the primary database. In other words, given a particular item of data ("published item") and a set of subscribers with a large number of subscribed items, one needs to be able to quickly and accurately find all of the subscriber(s) that are interested in receiving the published item. A particular complication is that the published item(s) that are published by the primary database are not known in advance.

One approach to address this problem is to compare each published item with the list of subscribed items of each of the subscribers. However, this approach requires a linear search time proportional to the number of subscribed items. For instance, if there are M subscribers, the search requires an order of M*N time (where N is the number of subscribed items). This is inefficient in environments involving a large number of subscribers and subscribed items.

An alternative approach is to build indexes on published or subscribed items to increase the efficiency of the search process. Historically, database indexes have been built on published or subscribed items in an attempt to achieve improved search times. However, a problem with traditional indexing is that since the published items are not known in advance, implementing the traditional approach to indexing is not feasible as it is not possible to pre-index all published items. A database index cannot be built for items that are not yet known.

Another issue is in enabling a subscriber to define the items that are of interest (i.e., those to be replicated from the primary database) using wildcards or negations. For example, a subscriber may wish to use a negation to indicate that the subscriber is interested in all items from the primary database other than a particular type of item. Alternatively, the subscriber may wish to use a wildcard to request all items of a certain type. For example, a subscriber may want to receive a copy of data in all tables owned by a particular "owner". Prior art replication systems do not have efficient methods for dealing with negations and searching for wildcards. The disadvantages with the traditional approach of comparing the published item with lists of subscribed items include that the traditional approach is inefficient, slow, and does not effectively handle negations and wildcards in lists of subscribed items.

What is needed is a solution which more efficiently resolves, given a particular item of data published by a primary database, the particular subscribers (i.e., replicate databases) to which the item of data should be replicated. The solution should be able to handle published items that are not known in advance. Ideally, the solution should enable subscribers to define the items of data they are to receive using wildcards and negations. The present invention provides a solution for these and other needs.

SUMMARY OF INVENTION

A system providing methodology for replication subscription resolution is described. In one embodiment, for example, a system of the present invention for determining subscribers to which a published item of data should be replicated is described that comprises: an interface module for receiving user input of lists of a plurality of subscribers, each list specifying items of data to be replicated to a given subscriber; a build module for building an index based on the lists of the plurality of subscribers containing entries indicating subscribers for each item of data specified in the lists and a default list of subscribers for items of data not matching any of the entries; and a resolution module for receiving a published item of data and determining subscribers to which the published item should be replicated based on the index.

In another embodiment, for example, a method of the present invention is described for determining subscribers to which a published item of data should be replicated, the method comprises steps of: receiving lists of a plurality of subscribers, each list specifying items of data to be replicated to a given subscriber; building an index based on the lists of the plurality of subscribers containing entries indicating subscribers to which each item of data specified in the lists should be replicated and a default list for indicating subscribers to published items of data not matching any of the index entries; given a published item of data, determining whether the published item matches at least one entry in the index; if the published item matches at least one entry, generating a set of subscribers to which the published item should be replicated based on the subscribers associated with the at least one entry; and otherwise, returning the default list of subscribers to which the published item should be replicated.

DETAILED DESCRIPTION

Glossary

Figure 1:
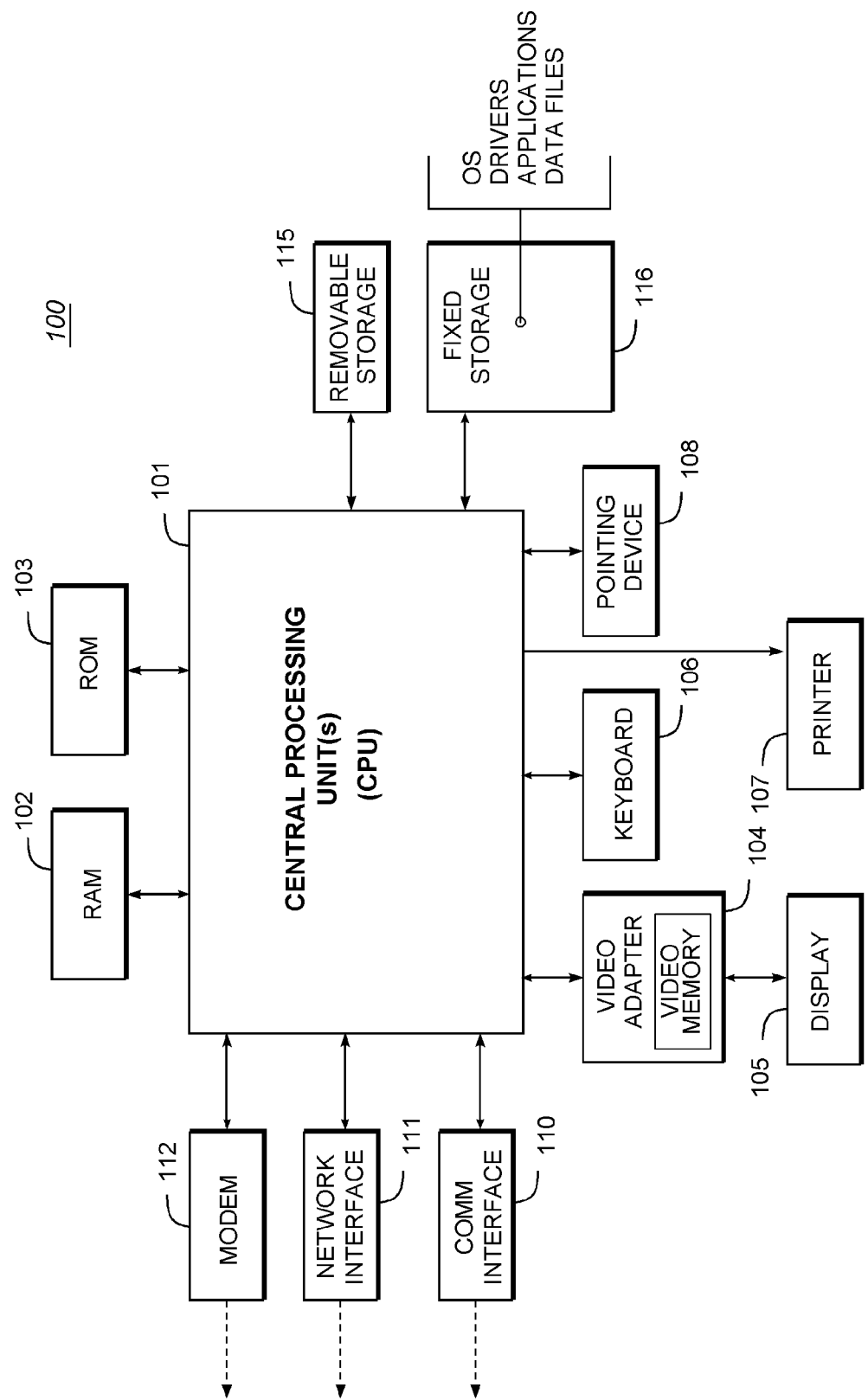
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

Hash: A hash (or hash values) is a smaller data type (e.g., number) that represents another, larger, data type (usually a string). A hash is typically a number that is generated from a string of text by a hashing function. The hash is substantially smaller than the text itself, and is generated in such a way that it is unlikely that some other text will produce the same hash value. Hashes play a role in security systems (e.g., to ensure that transmitted messages or files have not been tampered with). Hashing is also a method for facilitating accessing data records. Consider, for example, a list of names: John Smith, Sarah Jones, and Roger Adams. To create an index, called a hash table, for these records, one would apply a hashing function to each name to produce a unique numeric value such as the following: 1345873 John Smith, 3097905 Sarah Jones, 4060964 Roger Adams. To search for the record containing the name Sarah Jones, one just needs to reapply the hashing function, which directly yields the index key to the record. This is much more efficient than searching through all the records until the matching record is found.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-based Implementation

Basic System Hardware (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
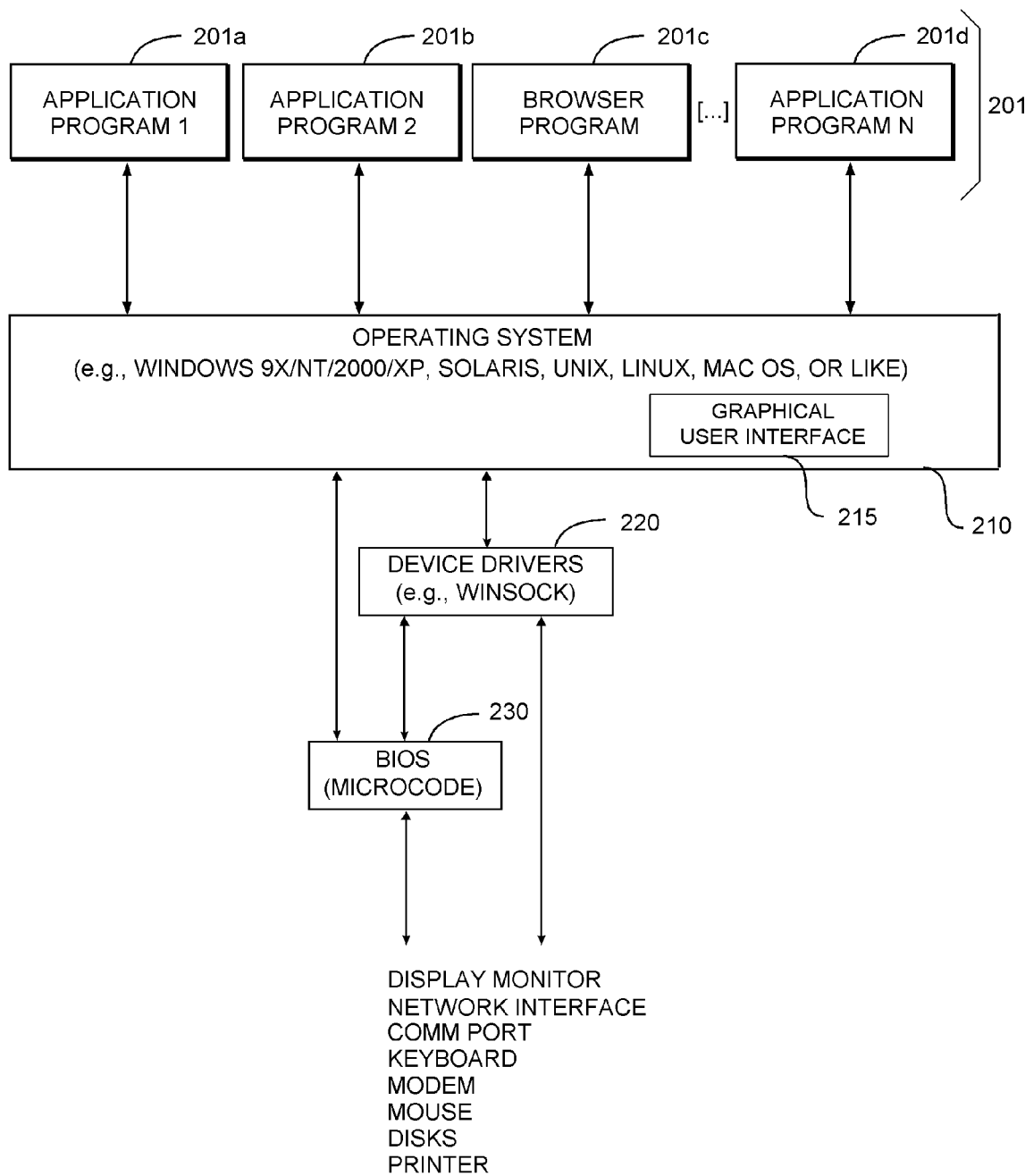
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

Client-Server Database Management System

Figure 3:
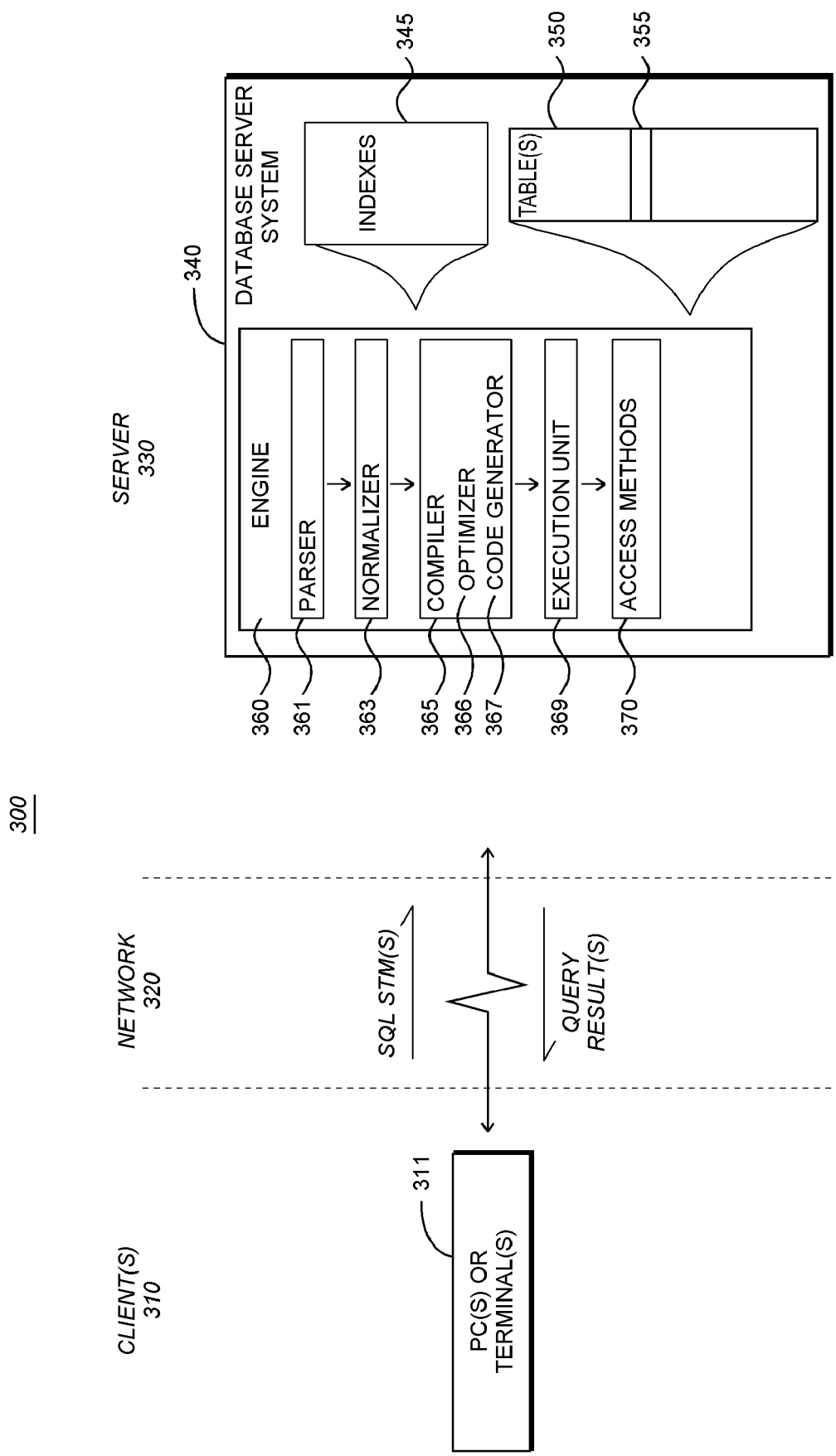
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, or Windows XP).

The database server system 340, which comprises Sybase® Adaptive Server® Enterprise (available from Sybase, Inc. of Dublin, Calif.) in an exemplary embodiment, generally operates as an independent process (i.e., independently of the clients), running under a server operating system such as Microsoft® Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. For a discussion of Sybase®-branded database servers and client/server environments generally, see, e.g., Nath, A., "The Guide to SQL Server", Second Edition, Addison-Wesley Publishing Company, 1995. For a description of Sybase® Adaptive Server® Enterprise, see, e.g., "Adaptive Server Enterprise 12.5.1 Collection: (1) Core Documentation Set and (2) Installation and Configuration," available from Sybase, Inc. of Dublin, Calif. This product documentation is available via the Internet (e.g., currently at sybooks.sybase.com/as.html). The disclosures of the foregoing are hereby incorporated by reference.

In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and an access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a primary database (e.g., primary database server) from which data is replicated to one or more replicate databases (e.g., replicate database servers). The present invention, however, is not limited to any particular environment or device configuration. Instead, the present invention may be implemented in any type of system architecture or processing environment capable of supporting the methodologies of the present invention presented in detail below.

Overview of System and Methodology for Replication Subscription Resolution

A problem in current data replication environments having a set of subscribers (e.g., replicate databases) requesting different subsets of data from a data source (e.g., a primary database) is in efficiently finding all of the subscribers that should receive a copy of a particular item published by the data source (referred to herein as a "published item"). As described above, it is not possible to pre-index all of the published items, as published items are unknown in advance. Accordingly, prior solutions typically involve comparing the published item with lengthy lists of subscribed items of each subscriber. A better solution which does not require a linear search time proportional to the number of subscribed items is needed, particularly in environments having multiple subscribers (e.g., replicate databases) each with a large number of subscribed items.

The present invention provides a replication solution which efficiently determines, given a particular item of data published by a primary database, the particular subscribers (i.e., replicate databases) to which the item of data should be replicated. The present invention enables the subscribers that are to receive the published item to be determined in constant time, even though all of the published items to be replicated are not known in advance. The solution also enables subscribers to define the items of data they wish to receive from a primary database using wildcards and negations.

Data or items in a database can be qualified (i.e., identified) by particular information which may vary depending on the specific database implementation that is involved. For purposes of the following discussion, it is assumed that items can be qualified by a sequence of two literal strings, e.g., "abc", and "def". More particularly, in the currently preferred embodiment of the present invention the data or objects are qualified by two literal strings which are referred to in the following discussion as: "owner" and "name". "Owner", for example, can refer to the owner of a table, and "name" may correspond to a table name, but the invention is not restricted to these two literal strings. Although the following discussion refers to two literal strings, the methodology of the present invention can also be implemented using a different number of strings or other different data types. For example, the present invention may be extended for a sequence of n literal strings, where n>0. Accordingly, the following discussion is for purposes of illustrating the operations of the present invention and not for purposes of limitation.

The approach of the present invention is to build a data structure referred to as a "name set index" (NSI) which provides the ability to efficiently search a large number of subscribed items, including subscribed items defined using negation operations and wildcards. The name set index is built based upon the lists of subscribed items of all subscribers (i.e., replicate databases). Methods are also provided for adding and deleting subscribers and subscribed items. In the currently preferred embodiment, a hashing mechanism is used in producing and searching the name set index (i.e., represented as a hash table). Each entry in the name set index (hash table) comprises a subscribed item and its subscribers. In the currently preferred embodiment, a subscribed item is defined using two literal strings (e.g., "owner" and "name" as discussed above). The subscribers are structured as a bitmap string of all subscribers, with one bit per subscriber.

The current invention also supports several forms of subscriptions. A "subscribed item" specifies an item(s) that a subscriber wants to receive from the primary database. A list of subscribed items can comprise a list of items in the primary database that the subscriber wants to receive. The list can alternatively include a list of items that the subscriber does not wish to receive. The following example illustrates these two different subscription forms:

is-of (sub-i1, sub-i2, . . . , sub-iN), or is-not-of (sub-i1, sub-i2, . . . , sub-iN), (i.e., negation).

For example, a subscriber could subscribe to receive everything (i.e., all items) published by a particular owner. Alternatively, a subscriber could request everything except for particular items which are listed (e.g., all items except for items published by a particular owner). Alternatively, the subscriber could specify a detailed list of all the subscribed items that are of interest. The present invention also enables a subscriber to specify items of interest using wildcards and negations.

The present invention includes search methods for searching the name set index to locate all subscribers that subscribe to (i.e., have indicated they want to receive) a particular published item. In the currently preferred embodiment, the search method of the present invention enables a search to be performed based on the first string and the second string. When building a name set index, one of the strings of a subscribed item may be substituted by a wildcard, i.e., "*". For example, "*.def" means to subscribe to all the items whose second literal string is "def". The methodology of the present invention in building an index (i.e., name set index) of subscribed items and providing for searching the index is described below in greater detail.

System Components

Figure 4:
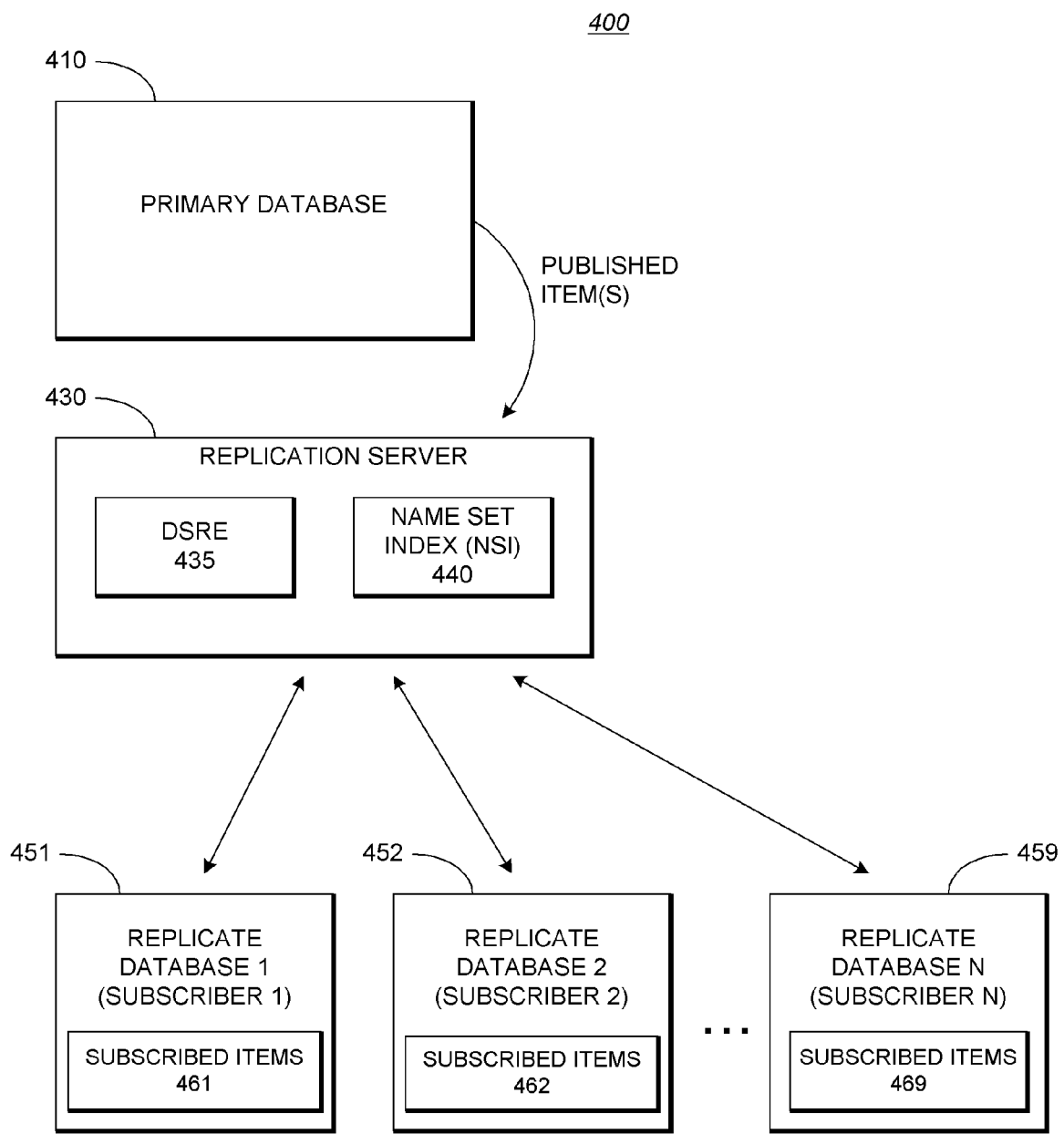
FIG. 4 is a block diagram of a database replication environment in which the present invention may be preferably embodied.

FIG. 4 is a block diagram of a database replication environment 400 in which the present invention may be preferably embodied. As shown, environment 400 includes a primary database (publisher) 410, a replication server 430, and replicate databases (subscribers) 451, 452, 459. As also shown, the replication server 430 includes a database subscription resolution engine (DSRE) 435 and a name set index (NSI) 440.

The primary database 410 is a database which generates or publishes data (i.e., published items). The primary database 410 may, for instance, be implemented using Sybase® Adaptive Server® Enterprise, available from assignee Sybase, Inc. of Dublin, Calif. Alternatively, the primary database may comprise another brand of database server. It should be noted that although a single primary database is shown at FIG. 4 and described in the following discussion, the system and methodology of the present invention may be used in conjunction with multiple primary databases. For example, another database replication environment could include multiple primary databases each replicating data to multiple subscribers.

The multiple replicate databases (subscribers) 451, 452, 459 may also be implemented using Sybase® Adaptive Server® Enterprise or an alternative database management system. Each of the subscribers also specifies a list of items (subscribed items) which it is interested in receiving from the primary database 410. These items of interest are represented by subscribed items 461, 462, and 469 associated with the subscribers 451, 452, and 459, respectively. As described above, these lists of subscribed items may be defined using wildcards and negations.

The lists of subscribed items 461, 462, 469 from each of the subscribers 451, 452, and 459 are consolidated by the database subscription resolution engine (DSRE) 435, a component of the replication server 430. The DSRE 435 builds the consolidated lists of subscribed items into a name set index (NSI) 440 for each primary database. (Note that in an environment involving multiple primary databases, a name set index is created for each primary database). In operation, the DSRE 435 determines the subscribers to which particular items of data published by a primary database (i.e., published items) should be replicated. The DSRE 435 receives information about a published item as input, searches for entries matching the published item in the NSI, and returns a bit map string of all subscribers that subscribe to receive the published item.

The NSI 440 is not a conventional index built on existing data from the primary database 410. Rather, the NSI is built on the lists of the subscribers, i.e., lists indicating which items of data the subscriber is interested in receiving (and/or not interested in receiving). Because the NSI 440 is built based on the interests of subscribers in receiving particular types of data, the NSI 440 can include items that may not be found in the primary database. The name set index (NSI) 440 is maintained by the replication server 430 and provides an index that is used for determining those subscriber(s) that are to receive particular items of information. Although once the name set index 440 is built it is largely fixed, the system of the invention also provides methods for modifying the NSI 440. These include methods for adding subscribers, removing subscribers, and so forth as described below in more detail. Each entry (or nameset) in the NSI 440 is indexed by "owner.name", and holds a bit map string to record the subscribing sites for this "owner.name" pair. If an "owner.name" pair does not exist in the corresponding NSI, a default bitmap is used as hereinafter described.

The system and methodology of the present invention provides for pre-building the name set index 440 for all subscribed items. In the currently preferred embodiment the name set index 440 is structured as a hash table. A number of different hashing (hash) functions may be used for implementation of the name set index 440. For example, a simple weighted hash function is used in the currently preferred embodiment. Given a character string key (e.g., key="Judy"), the following example illustrates the general operation of this hash function:

```
1: {
2:   hash_index = 0
3:   for each character, i.e., i=1, i=2, i=3, and i=4
4:     hash_index += i * char_value(key[i])
5:   hash_index = hash_index modular num_hash_table_slots
6: }
```

In the above example, char_value is the ASCII encoding of a character. For instance, the char_value of the character 'J' is equal to 74 and the char_value of the character 'u' is equal to 117.

Alternatively, an even simpler hash function such as the following could be used:

```
1: {
2:   hash_index = 0
3:   for each character
4:     hash_index += char_value(key[i])
5:   hash_index = hash_index modular num_hash_table_slots
6: }
```

Those skilled in the art will appreciate that the above are only examples illustrating hash functions that may be utilized for implementation of the name set index and that a number of other hash functions could be used, if desired.

The total time for building a NSI of M subscribers takes an order of M*N time (where N represents the average number of subscribed items of subscribers). However, once built the NSI usually changes rather infrequently in most typical implementations. To add a subscriber to, or drop a subscriber from, a NSI takes an order of N time. However, as the efficiency of searches for subscribers to which data is to be replicated is improved considerably, the cost of building and maintaining the NSI is more than offset by the reduced search times given that searches are performed frequently while changes to the NSI are relatively infrequent.

Once the NSI 440 is built, the replication server 430 receives items of data that are published by the primary database 410. When a published item is received, the replication server 430 is responsible for replicating the published item to the appropriate subscribers. Of particular interest, the DSRE 435 of the replication server 430 consults the NSI 440 to determine which subscribers have requested (i.e., have subscribed to receive) the published item. For each given published item, searching the NSI 440 results in a set of subscribers that subscribe to the item. The search is performed in an order of constant time, which represents a considerable improvement over prior art techniques. Additionally, the system has special mechanisms to deal with indexing "is-not-of" (negation) lists and wildcards. After the subscriber(s) requesting the item have been determined, the replication server 430 then replicates the published item to the identified subscriber(s). The operations of the system of the present invention in building the name set index and using the NSI to search for subscribers that are to receive items of data published by the primary database are described below in greater detail.

Detailed Operation

The following description presents method steps that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

Building Name Set Index

Figure 5:
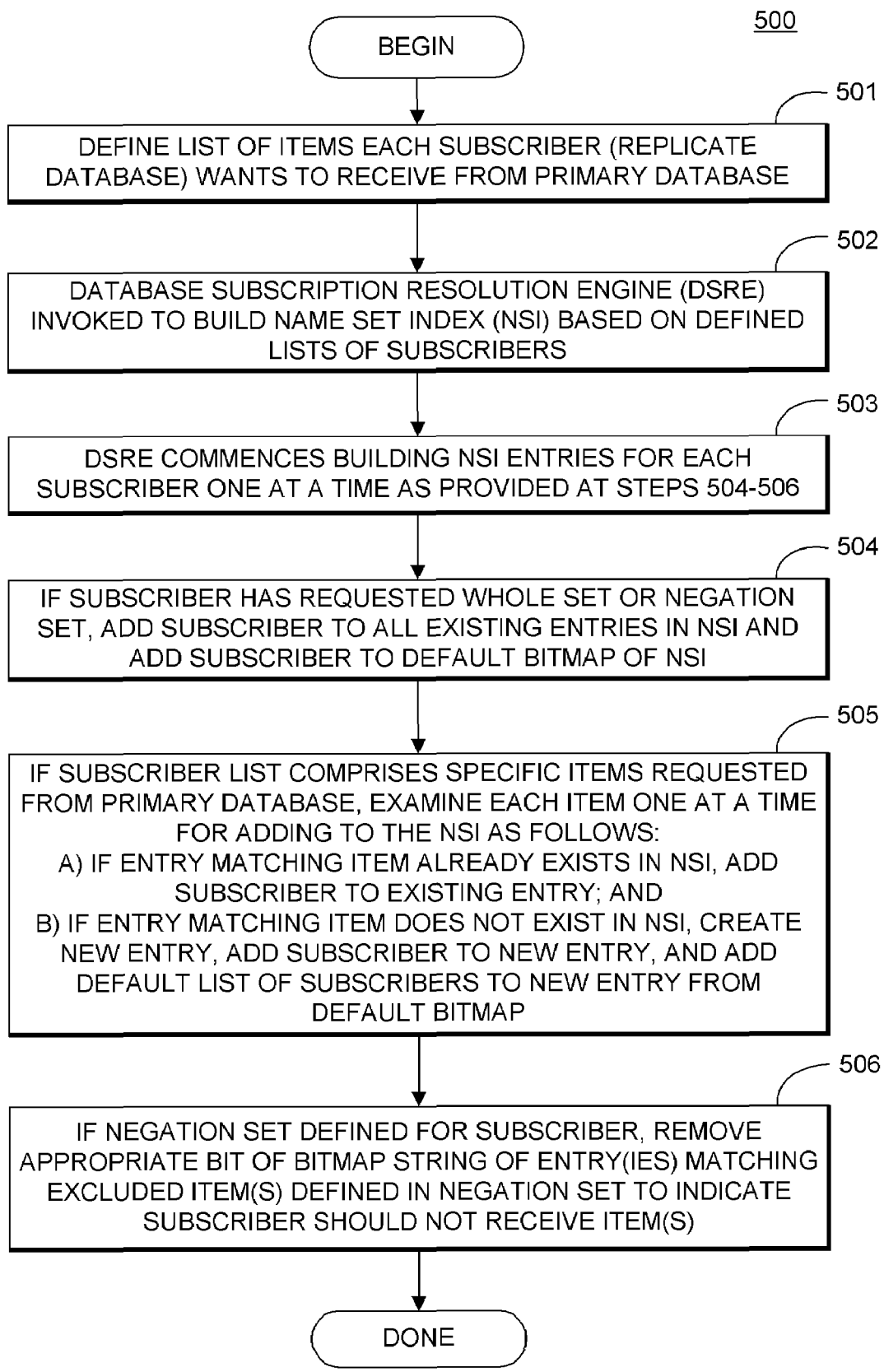
FIG. 5 is a flowchart illustrating the process for building a name set index for replication subscription resolution.

FIG. 5 is a flowchart 500 illustrating the process for building a name set index for replication subscription resolution. For purposes of illustrating the operations of the present invention, the following discussion describes building a single name set index (NSI) for replication of data from a primary database to a plurality of replicate databases. However, a replication environment may provide for building multiple NSIs for replication of data from a plurality of primary databases to a plurality of subscribers.

The process begins at step 501 with the definition of the set (list) of items each of the subscribers (replicate databases) wants to receive from the primary database. A user interface is provided in the currently preferred embodiment of the system enabling a user (e.g., administrator) to specify the items to be replicated to each of the replicate databases. Although in some cases a user may specify that the same items be replicated to each of the replicate databases (subscribers), in many cases different items are specified for different subscribers. It should be noted that the system of the present invention allows users to replicate all of the data (i.e., whole sets), all but some of the data (i.e., negation sets), or only specified items of data published by the primary database as hereinafter described.

At step 502, the database subscription resolution engine (DSRE) is invoked to build a name set index (NSI) for resolving replication subscriptions based on the lists defined by the subscribers. The DSRE starts with an empty NSI and builds one NSI per primary database. At step 503, the DSRE commences building NSI entries for each subscriber one at a time and adding the entries for each subscriber to the NSI. As described below, the NSI is a hash table which, when built, typically contains a number of entries. Each "entry" represents a subscribed item and its subscribers. The following steps 504-506 are performed for each subscriber in building the NSI.

At step 504, if the subscriber has requested a whole set (e.g., all items published by the primary database) or a negation set (e.g., all items published by the primary database except for certain excluded item(s)), the subscriber is added to all existing entries in the NSI hash table. Each entry includes a bitmap string for listing all subscribers to a particular item. In the currently preferred embodiment, each entry also includes a (hashed) owner (string) and a name (string) identifying item(s) of interest (subscribed item(s)). The subscriber specifying a whole set or negation set is also added to the default bitmap string of the NSI at this step.

If the subscriber list comprises specific items that are requested from the primary database, each item is examined one at a time for adding to the NSI at step 505. This involves two substeps based on whether or not the NSI includes an entry matching the item. A determination is made as to whether or not an entry already exists in the NSI for the item. At step 505A, if the NSI contains an entry matching the item (i.e., the item requested by the subscriber), the subscriber is added as a subscriber to the entry. At substep 505B, if the entry does not exist, a new entry is created and the subscriber is added as a subscriber to the new entry. At this substep 505B, the default list of subscribers (i.e., any subscribers to the "default" bitmap of the NSI) are also added to the newly created entry from the default bitmap. It should also be noted that if the owner or name is missing, a wildcard ("*") will be used instead (for example as "owner.*" or "*.name") for creating the entry.

At step 506, if a negation set has been specified (e.g., subscriber requests all published items except for certain excluded items), then the appropriate bit of the bitmap string of the NSI entry or entries (i.e., the entry(ies) corresponding to each excluded item) is removed to indicate that the subscriber should not receive the item. For example, if a subscriber's list specifies that the subscriber does not want to receive any published items with an owner "Judy", then the bit flags for the subscriber in all corresponding entries in the NSI (i.e., those having an owner "Judy") are removed to indicate that the subscriber does not want to receive these items. After all subscribers have been processed, the building of the NSI is complete. The name set index may then be used for replication subscription resolution as described below.

Subscription Resolution

Figure 6:
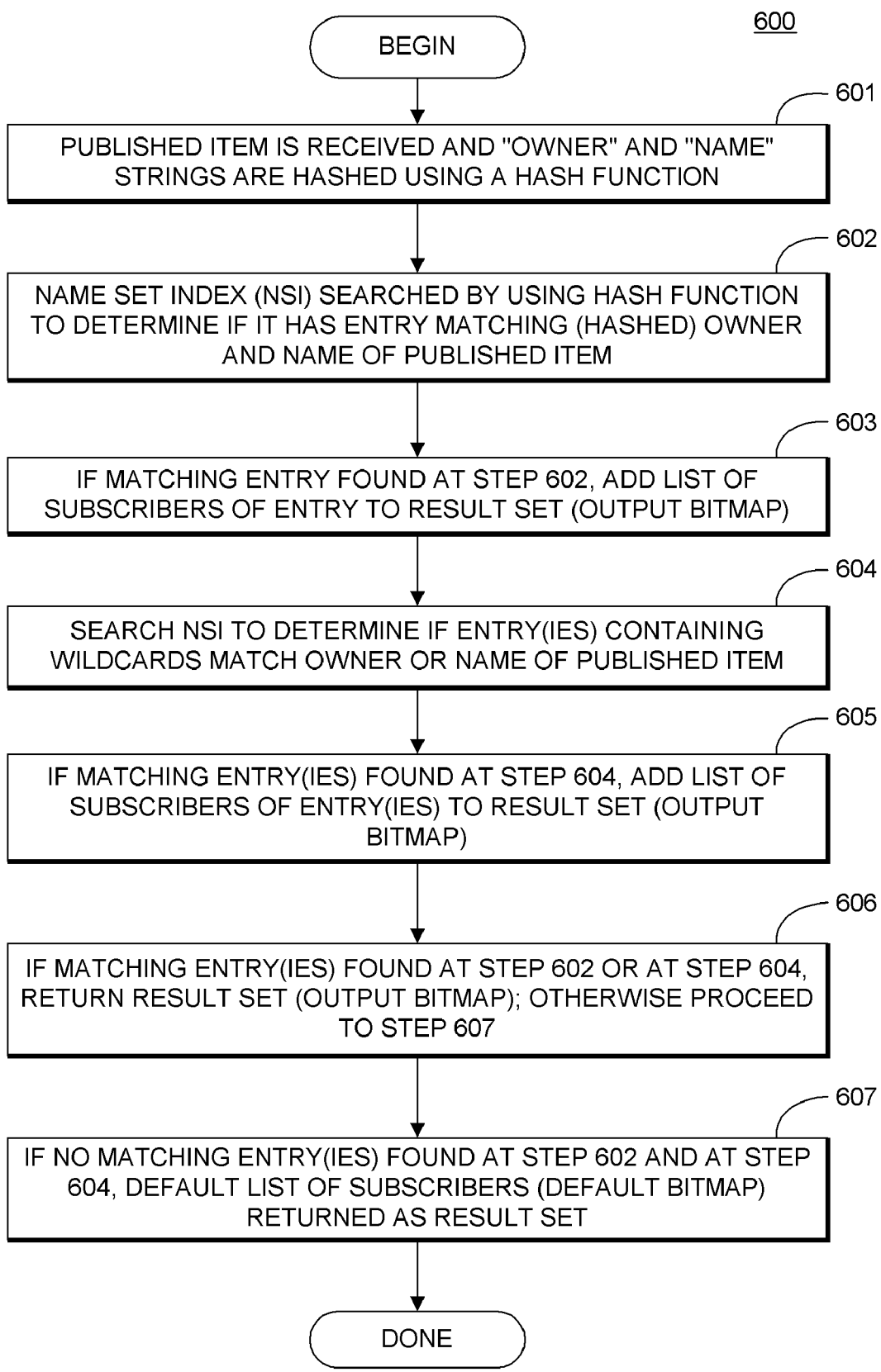
FIG. 6 is a flowchart illustrating the methods of operation of the present invention in determining the subscribers that should receive a particular item published by the primary database.

FIG. 6 is a flowchart 600 illustrating the methods of operation of the present invention in determining the subscribers that should receive a particular item published by the primary database. Given a particular item published by the primary database, the system and methodology of the present invention determines the set of subscribers (replicate databases) to which the published item should be replicated. The following discussion uses an example of an implementation in which items of data are qualified by two literal strings: "owner" and "name". However, the system and methodology of the present invention may also be used with data that is qualified by a different number and/or type of strings.

At step 601 an item of data (published item) is received and the "owner" and "name" strings of the published item are hashed using a hash function. At step 602, the name set index (NSI) is searched by using the hash function to determine if the NSI has an entry matching the (hashed) owner and name of the published item. If a matching entry is found at step 602, the list of subscribers associated with the matching entry is added to the result set (output bitmap) at step 603. The result set is an output bitmap indicating the set of subscribers to which this published item should be replicated.

At step 604, the NSI is searched for entries containing wildcards matching the published item. As described above, an entry may be created using a wildcard (e.g., as "*.name" or "owner.*"). One or more wildcard entries may match the name string or owner string of a published item. If any matching wildcard entry(ies) is found at step 604, the list of subscribers associated with the matching entry(ies) is added to the result set (output bitmap) at step 605.

At step 606, if the "owner.name" of the published item matched any of the entries in the NSI at steps 602 or 604, the output bitmap (result set) with the list of subscribers associated with the matching entry(ies) is returned. This would include the subscribers added to the result set at step 603 and/or step 605. However, if the published item did not match any of the entries at steps 602 and 604, the default bitmap (default list of subscribers) is returned as the result set at step 607. The result set (output bitmap) that is generated may then be used for replication of the published item to the subscribers. The data structures and operations of the present invention for replication subscription resolution are described in greater detail below.

High Level Data Structures

In its currently preferred embodiment, the system of the present invention includes several data structures and functions which implement the methodology of the present invention. The data structures provided in the currently preferred embodiment include the name set index or NSI, an entry structure, and a bitmap string. Each of these data high level data structures will next be described.

The name set index (NSI) is an index (array) of all subscribed items. The name set index is currently implemented as a hash table and includes a number of entries. The following is a representation of the NSI data structure:

```
1: /* NSI: Name Set Index, one NSI per primary site */
2: NSI:
3: {
4:     Function    hash;            /* hash function */
5:     ENTRY       item[MAX_ITEM + 1]; /* hash table */
6:     BM          default;         /* default sites if found no item in NSI */
7: }
```

Each NSI hashes all subscribed items of subscribers. As shown above at line 5, the NSI includes an array (hash table) of entries. In the currently preferred embodiment, the entry includes an owner (string) and a name (string) identifying item(s) of interest, and a bitmap string indicating the sites that subscribe to the item(s). The index key can be "owner.name", "owner.*" if name is not presented, or "*.name" if owner is not presented. As described below, each entry has a bit map string which lists all the sites that subscribe to the indexed subscribed item. As shown at line 6, the NSI also includes a default bitmap (BM default) which is used in a search if an "owner.name", "owner.*", or "*.name" does not exist in the NSI. This default bitmap is provided for indicating subscribers that are interested in receiving items in addition to those described by NSI entries.

Each "entry" represents an individual subscribed item and its subscribers as follows:

```
1: /* Subscribed item, one entry per item */
2: ENTRY:
3: {
4:     Char owner[MAX_LEN_C+1];  /* subscribed item owner */
5:     Char name[MAX_LEN_C+1];   /* subscribed item name */
6:     BM   sites;               /* subscribers to this entry */
7: }
```

(Following line numbers refer to Program Code #4 above.) As shown above at lines 4-5, in the presently preferred embodiment, each individual item is qualified by two literal strings: owner and name. However, a different number of strings could also be used in an alternative implementation as noted above. In the presently preferred embodiment, the "owner.name" string serves as the hash key for the hash table. Each entry also includes a bitmap string which represents all sites subscribing to a subscribed item, with one bit per subscriber. For instance, if there are three subscribers, the first bit indicates whether the first subscriber is to receive the item, the second bit is an indicator for the second subscriber, and the third bit for the third subscriber.

The third data structure is a bitmap string for all subscribers as follows:

```
1: /* Bit map string for all subscribers */
2: BM:
3: {
4:     BYTE bitmap[MAX_SITE/8 + 1]  /* one bit per subscriber */
5: }
```

This structure is used to map from the NSI structure to a specific subscriber. For example, in the currently preferred embodiment, an entry {owner="Judy", name="book", sites=010011} means that the second, fifth and sixth subscribers want the item "Judy.book" from the primary database, and the first, third, and fourth do not want this item.

High Level Functions

The functions provided in the currently preferred embodiment include the following: (1) "Build", which builds a name set index (NSI); (2) "Search", which searches the NSI for subscribers that subscribe to particular item(s) published by the primary database; (3) "Add", which adds a subscriber to the NSI; and (4) "Remove", which deletes a subscriber from the NSI. If a subscriber changes the list of subscribed items that it wants to receive from the primary database, this is generally handled by performing a "Remove" operation and then performing an "Add" operation with the new list of subscribed items. The operations of each of these functions on the above data structures are described below in greater detail.

Build Function

The Build function initially builds a NSI for a primary database (also referred to as a "primary site"). One NSI is built per primary database. The following is high-level pseudocode for the Build function:

```
1: /* Build a NSI for a given primary site */
2: BUILD(input Site, input/output NSI)
3: {
4:     /* One NSI per primary site */
5:     NSI = empty
6:     For each Sub that subscribes to the primary site Site
7:         ADD(Sub, NSI)
8: }
```

(Following line numbers refer to Program Code #6 above.) As shown at line 2, the NSI is built for a particular primary site ("input Site"). The Build function starts with an empty name set index as provided at line 5. Given a list of subscribers, each subscriber that subscribes to the primary site (i.e., primary database) is added one at a time. As shown at lines 6-7, the Build function calls the below Add function to add each subscriber one at a time.

The following pseudocode illustrates the Add function which is called by the above Build function to add a subscriber to the NSI:

```
1: /* Add a subscriber to NSI */
2: ADD(input Sub, input/output NSI)
3: {
4:
5:     Sub_list = subscribed item list of the Sub
6:     Site = the site of the subscriber
```

-continued

```
7:
8:     /* For a whole set, all items should go to the subscriber */
9:     /* For a negation set, assume all items go to the subscriber */
10:    If Sub_list is a whole set or a negation set
11:        For each valid NSI.item
12:            NSI.item[Index].sites += Site
13:        NSI.default += Site
14:
15:    /* Add one subscribed item to NSI at a time */
16:    For each "owner.name" in Sub_list
17:        Index = NSI.hash("owner.name")
18:        If NSI.item[Index] does not exist
19:            /* This is a new item */
20:            NSI.item[Index].owner = "owner"
21:            NSI.item[Index].name = "name"
22:            NSI.item[Index].sites = NSI.default
23:        Else
24:            NSI.item[Index].sites += Site
25:
26:        /* We have assumed that all items go to the subscriber */
27:        /* However, this item should not go to the subscriber */
28:        If Sub_list is a negation set
29:            NSI.item[Index].sites -= Site
30: }
```

(Following line numbers refer to Program Code #7 above.) The above Add function is called for initially building a name set index (NSI) for a given primary database. It may also be called for adding a subscriber to an existing NSI. When invoked, the Add function adds a subscriber to the NSI. A subscriber may have a list of subscribed items that the subscriber wants to receive, At line 5, "Sub_list" is the list of items that the subscriber wants to receive. This list may comprise a list of the published items that the subscriber is interested in receiving and may include whole sets or negation sets. A whole set may indicate that a subscriber is interested in everything in the primary database. A list may also comprise a negation set indicating that the subscriber is interested in receiving everything from the primary database except for the specific item (or items) that are listed as exclusions. In any ease, the Sub_list identifies whatever portion of the primary database that is to be replicated to the subscriber. The "Site" at line 6 identifies the subscriber.

For a whole set, all items published by the primary database should be replicated to the subscribing site. For a negation set, it is assumed that all items (other than those specified as not being required) go to the subscribing site. For example, a subscriber may request "all items but x". As shown above at lines 11-13, in the event of whole sets and negations, the Add function goes through all the existing entries in the NSI hash table and marks the entire set as being subscribed to by this subscriber (any excluded items in the case of negations are removed as described below). The NSI also includes a "default" category to deal with whole sets and negations. For example, if a subscriber wants to subscribe to everything from the primary database, then the subscriber is also subscribed to the "default" bitmap of the NSI structure, which indicates that the subscriber will receive any items published by the primary database that do not match any of the entries in the NSI hash table.

If the subscriber specifies a list of items that they wish to receive, then the Add function goes through the Sub_list as provided above at lines 16-22. To add one subscriber to the NSI at a time, given a list of subscribed items, each subscribed item is examined one by one. First, a search is made for the subscribed item in the hash table, using a hash of "owner.name" as a key to search the hash table. For each "owner.name", a determination is made as to whether or not the NSI hash table includes an entry corresponding to this item. If the owner or name is missing, will be used instead (for example as "owner.*" or "*.name") for creating the entry. However, an entry for will not be created in the NSI as item "*.*" is equivalent to subscribing to the whole set. If the NSI hash table does not include an entry for an item, then a new entry is created for the item. The entry is entered into the name set index with this subscriber listed as subscribing to the item. The sites subscribing to the "default" category are also subscribed to the new item.

If a subscriber is interested in everything but a specific item or items (negation set), the subscriber is added to all entries as provided above. However, the pseudocode at lines 28-29 provides in the case of negations (e.g., "all items but x") to indicate the subscriber does not want to receive a particular item (e.g., item x). In the currently preferred embodiment, the bit flag for a particular entry indicates whether or not a subscriber is to receive an item. In this case, the bit flag for this subscriber is removed to indicate that the subscriber does not wish to receive the excluded item.

In the case that the name set index (NSI) is being built, the above Add function is called for each subscriber to build up the hash table entries of the NSI. Eventually, when the build process is complete the NSI will contain an entry for every item in the consolidated lists of all subscribers plus one additional "default" bitmap to handle unspecified items and negations. As described above in the discussion of the NSI data structure, a "default" bit map is provided for indicating subscribers that are interested in receiving items in addition to those described by NSI entries.

Remove Function

The Remove function is invoked with a subscriber to remove from the NSI. The pseudocode for the Remove function is as follows:

```
1: /* Drop a subscriber from NSI */
2: REMOVE(input Sub, input/output NSI)
3: {
4:     Site = site of the subscriber
5:     NSI.default -= Site
6:
7:     For each valid NSI.item
8:         NSI.item[Index].sites -= Site
9:         If NSI.item[Index].sites = NSI.default
10:            Remove NSI.item[Index]
11: }
```

The above Remove function first removes the subscriber out of the default bitmap. The function then goes through the hash table one entry at a time and removes the subscriber out of the corresponding bitmap(s). For an entry having the identical subscribers as the default, the entry will be removed from the name set index.

Search Function

After the name set index is built, it may be used in operation to quickly and efficiently determine those subscribers that should receive items published by the primary database. The pseudocode for the Search function is as follows:

```
1: /* Search NSI for "owner.name" */
2: SEARCH(input NSI, input owner, input name, output BM)
```

-continued

```
3: {
4:   BM = empty
5:
6:   /* Search "owner.name" first */
7:   Index = NSI.hash("owner.name")
8:   If NSI.item[Index] exists
9:      BM += NSI.item[Index].sites
10:
11:  /* If "*.name" is in NSI, its destination subscribes this
     "owner.name"*/
12:  Index = NSI.hash("*.name")
13:  If NSI.item[Index] exists
14:     BM += NSI.item[Index].sites
15:
16:  /* If "owner.*" is in NSI, its destination subscribes this
     "owner.name" */
17:  Index = NSI.hash("owner.*")
18:  If NSI.item[Index] exists
19:     BM += NSI.item[Index].sites
20:
21:  /* If "owner.name" does not exist in any entry, use default */
22:  if BM is empty
23:     BM = NSI.default
24: }
```

(Following line numbers refer to Program Code #9 above.) When a published item is received by the replication server, the above Search function of the database subscription resolution engine (DSRE) is invoked to resolve which subscribers should receive the published item (i.e., to which subscribers should the published item be replicated). As illustrated above at line 2, the input parameters to the above Search Function comprise a name set index (NSI) to be searched, and owner (string), and a name (string). As previously described, the owner and name strings identify a particular item published by the primary database in the currently preferred embodiment of the present invention. The function outputs a bitmap (output BM) indicating the subscribers that should receive the published item.

As provided at lines 7-9, the above Search function first hashes the "owner" and "name" strings (i.e., "owner.name") and searches the NSI to determine if the NSI contains a matching entry. If a matching entry is found, the list of subscribers associated with the matching entry is added to the output bitmap. The output bitmap indicates the set of subscribers to which this published item should be replicated.

The Search function also handles wildcards and negations. As shown at lines 12-19, the Search function deals specifically with wildcards and utilizes hashing to quicken the search. As shown, if "*.name" is in the NSI, its destination subscribes this to "owner.name". For example, a subscriber may request all items with the name "sales", irrespective of what the owner may be (i.e., the owner can be anyone). A corresponding entry in the NSI would be "*.sales" (where "*" represents the wildcard). In this case, any published item of data having the name "sales" would match this entry. If a published item with owner "Joe" and name "sales" is received, this is a match for the entry "*.sales". In this case, the subscribers associated with the "*.sales" entry are added to the output bitmap. Similarly, if "Judy.*" is in the NSI, its destination subscribes to any published item having "Judy" as the owner. Although the above examples refer to matching two strings, those skilled in the art will appreciate that the methodology of the present invention may also be used with a different number of strings.

If the "owner.name" of the published item does not match any of the entries in the NSI (including any entries containing wildcards as described above), the default bitmap is used. For example, if no subscriber has specifically listed this published item (which is not to say that no one is interested in it, rather no subscriber has specifically listed the item), then no matching entries will be found in the hash table. However, subscribers that have indicated an interest in all items published by the primary database or that have defined items of interest using negations may still receive this published item. For example, if a subscriber requests "everything but items with name x", then the subscriber will be a subscriber of the "default" element of the NSI as described above. In the case a published item does not match any of the entries of the NSI, then the published item will be replicated to the set of subscribers associated with the default element (i.e., the default bitmap of subscribers).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A system which determines subscribers to which a published item of data is to be replicated, the system comprising:
   a computer having a processor and memory;
   an interface module which receives user input of lists from a plurality of subscribers, each list specifying items of data to be replicated to a given subscriber, wherein said lists include wildcard information and negation information;
   a build module which builds an index based on the lists from the plurality of subscribers, the index including an entry for each item of data to be replicated and a bitmap string associated with each entry representing subscribers to each item of data, with at least one entry including a wildcard, and one entry including a default list of subscribers for items of data not matching any of the other entries, wherein the bitmap string includes one bit for each subscriber; and
   a resolution module which receives a published item of data, determines subscribers to which the published item is to be replicated based on the index, and replicates enabling said published item to be replicated to subscribers, wherein time for determining subscribers to the published items does not depend on number of subscribers.

2. The system of claim 1, wherein at least one of the plurality of subscribers comprises a replicate database.

3. The system of claim 1, wherein the published item of data comprises an item of data published by a primary database for replication.

4. The system of claim 1, wherein the lists of from the plurality of subscribers include a list having negation information specifying at least one item of data not to be replicated to a particular subscriber.

5. The system of claim 1, wherein the lists from the plurality of subscribers include a list comprising a negation set indicating that all data other than items specified on the list should be replicated to a particular subscriber.

6. The system of claim 1, wherein the interface module receives at least one string identifying data to be replicated to a subscriber.

7. The system of claim 6, wherein the index comprises a hash table and the build module builds the hash table based, at least in part, on said at least one string.

8. The system of claim 1, wherein the index built by the build module comprises a hash table of entries based on the lists from the plurality of subscribers.

9. The system of claim 1, wherein the build module builds at least one entry including a wildcard providing that all items of data of a certain type are to be replicated to subscribers of said at least one entry.

10. The system of claim 1, wherein the build module builds a bitmap string representing the default list of subscribers.

11. The system of claim 10, wherein the build module adds each subscriber having a list comprising a whole set to the bitmap string representing the default list of subscribers.

12. The system of claim 10, wherein the build module adds each subscriber having a list comprising a negation set to the bitmap string representing the default list of subscribers.

13. The system of claim 1, wherein the resolution module generates a hashed value based on at least one string identifying the published item.

14. The system of claim 13, wherein the resolution module searches for the hashed value in the index.

15. The system of claim 14, wherein the resolution module determines subscribers to which the published item should be replicated based upon at least one entry in the index including the hashed value when the hashed value is found in the index.

16. The system of claim 14, wherein the resolution module determines subscribers to which the published item should be replicated based upon the default list when the hashed value is not found in the index.

17. The system of claim 13, wherein the resolution module receives a plurality of strings identifying the published item and substitutes a wildcard for one of the strings to search for matching entries in the index which include a wildcard.

18. The system of claim 1, wherein the resolution module determines subscribers to which the published item should be replicated based upon the default list of subscribers for published items without matching entries in the index.

19. The system of claim 1, wherein the build module removes a subscriber from the index in response to a request to remove a subscriber.

20. A method which determines subscribers to which a published item of data is to be replicated, the method comprising:
receiving lists from a plurality of subscribers, each list specifying items of data to be replicated to a given subscriber, wherein said lists include wildcard information and negation information;
building an index based on said lists from the plurality of subscribers, the index including any entry for each item of data to be replicated and a bitmap string associated with each entry identifying subscribers to which each item of data specified in said lists should be replicated, at least one entry including a wildcard, and one entry including a default list identifying subscribers to published items of data not matching any of the other index entries, wherein the bitmap string includes one bit for each subscriber;
given a published item of data, determining whether the published item matches at least one entry in the index, wherein time for determining subscribers to the published item does not depend on number of subscribers;
if the published item matches at least one entry in the index, generating a set of subscribers to which the published item is to be replicated based on the subscribers associated with said at least one entry; and
otherwise, returning the default list of subscribers to which the published item is to be replicated.

21. The method of claim 20, wherein at least one of the plurality of subscribers comprises a replicate database.

22. The method of claim 20, wherein the published item of data comprises an item of data published by a primary database for replication.

23. The method of claim 20, wherein said receiving step includes specifying items of data not to be replicated to a subscriber.

24. The method of claim 20, wherein said receiving step includes receiving a list comprising a negation set indicating that all data other than items specified on the list should be replicated to a subscriber.

25. The method of claim 20, wherein said receiving step includes receiving at least one string identifying data to be replicated to a subscriber.

26. The method of claim 25, wherein said index comprises a hash table and said building step includes building the hash table based on said at least one string.

27. The method of claim 26, wherein said step of building a hash table includes building a bitmap string for each entry representing subscribers to an item of data.

28. The method of claim 20, wherein said index comprises a hash table and said building step includes building a hash table of entries.

29. The method of claim 20, wherein said step of generating a bitmap string includes removing a subscriber from the bitmap string representing subscribers to an item of data when the subscriber has specified the item of data as an excluded item in a negation set.

30. The method of claim 20, wherein said building step includes building a bitmap string representing the default list of subscribers.

31. The method of claim 30, wherein said step of building a bitmap string for representing the default list of subscribers includes adding each subscriber having a list comprising a whole set.

32. The method of claim 30, wherein said step of building a bitmap string representing the default list of subscribers includes adding each subscriber having a list comprising a negation set.

33. The method of claim 20, wherein said building step includes building at least one entry including a wildcard indicating all items of data of a certain type should be replicated to a subscriber.

34. The method of claim 33, wherein said determining step includes receiving a plurality of strings identifying the published item and substituting a wildcard for one of the strings to search for matching entries in the index which include a wildcard.

35. The method of claim 20, wherein said determining step includes generating a hashed value based on at least one string identifying the published item.

36. The method of claim 35, wherein said determining step includes searching for the hashed value in the index.

37. The method of claim 20, wherein said determining step includes building a list of subscribers based upon a plurality of matching entries.

38. A computer-readable medium having processor-executable instructions which, when executed by a processor, perform the method of claim 20.

* * * * *